(12) United States Patent
Lauter et al.

(10) Patent No.: US 8,520,841 B2
(45) Date of Patent: Aug. 27, 2013

(54) ALGORITHMS FOR GENERATING PARAMETERS FOR GENUS 2 HYPERELLIPTIC CURVE CRYPTOGRAPHY

(75) Inventors: Kristin E. Lauter, La Jolla, CA (US); Ning Shang, West Lafayette, IN (US)

(73) Assignee: Microsoft Corporation, Redmond, WA (US)

( * ) Notice: Subject to any disclaimer, the term of this patent is extended or adjusted under 35 U.S.C. 154(b) by 1048 days.

(21) Appl. No.: 12/125,834

(22) Filed: May 22, 2008

(65) Prior Publication Data

US 2009/0290705 A1 Nov. 26, 2009

(51) Int. Cl.
*H04L 9/06* (2006.01)
(52) U.S. Cl.
USPC ............... 380/30; 380/28; 380/255; 380/279; 380/44; 713/176
(58) Field of Classification Search
USPC .......................................................... 380/30
See application file for complete search history.

(56) References Cited

U.S. PATENT DOCUMENTS

| | | | |
|---|---|---|---|
| 6,560,336 B1 * | 5/2003 | Arita ............................... | 380/28 |
| 6,910,058 B2 * | 6/2005 | Futa et al. ..................... | 708/491 |
| 7,003,537 B1 * | 2/2006 | Tamura ........................ | 708/492 |
| 7,020,776 B2 | 3/2006 | Lauter et al. | |
| 7,215,780 B2 * | 5/2007 | Lambert et al. ............... | 380/279 |
| 7,236,589 B2 | 6/2007 | Lauter et al. | |
| 7,885,406 B2 * | 2/2011 | Lauter et al. ..................... | 380/44 |
| 2002/0041681 A1 * | 4/2002 | Hoffstein et al. ............... | 380/28 |
| 2002/0062330 A1 * | 5/2002 | Paar et al. ...................... | 708/492 |
| 2004/0120520 A1 * | 6/2004 | Harley ............................. | 380/30 |
| 2005/0036621 A1 * | 2/2005 | Venkatesan et al. .......... | 380/263 |
| 2005/0201553 A1 * | 9/2005 | Katagi et al. ..................... | 380/28 |
| 2006/0120528 A1 * | 6/2006 | Weng ............................. | 380/255 |
| 2006/0140398 A1 * | 6/2006 | Avanzi ............................ | 380/30 |
| 2006/0206554 A1 | 9/2006 | Lauter et al. | |
| 2007/0053506 A1 * | 3/2007 | Takashima ...................... | 380/28 |
| 2008/0084997 A1 * | 4/2008 | Lauter et al. ................... | 380/30 |

OTHER PUBLICATIONS

"A CRT Algorithm for Constructing Genus 2 Curves Over Finite Fields", Jan. 11, 2007.*
Annegret Weng. Constructing hyperelliptic curves of genus 2 suitable for cryptography. Math. Comp., 72(241):435-458 (electronic), 2003.*
NPL: "A CRT Algorithm for Constructing Genus 2 Curves Over Finite Fields", Jan. 11, 2007.*
Constructing Hyperelliptic Curves of Genus 2 Suitable for Cryptograph, 2002.*
"Factoring Polynomials and the Frobenius", at <<http://sbseminar.wordpress.com/2007/08/24/factoring-polynomials-and-the-frobenius/>>, 2007, pp. 4.

(Continued)

*Primary Examiner* — Kambiz Zand
*Assistant Examiner* — Yonas Bayou
(74) *Attorney, Agent, or Firm* — Lee & Hayes, PLLC

(57) ABSTRACT

An exemplary method includes defining a CM field, representing coefficients of a Frobenius element of a hyperelliptic curve over a prime field as non-linear polynomials that are functions of an integer x and selecting a value for x whereby the product of the Frobenius element and its complex conjugate is a prime number. Such a method may further include determining the order of the Jacobian of the hyperelliptic curve, for example, where the order is an almost prime number. Various other methods, devices, systems, etc., are also disclosed, which may be optionally used for cryptography.

19 Claims, 4 Drawing Sheets

(56) References Cited

OTHER PUBLICATIONS

Jacobson, et al., "Hyperelliptic Curves and Cryptography", at <<www.math.uwaterloo.ca/~ajmeneze/publications/hcc.pdf>>, American Mathematical Society, pp. 28.

Lange, "Efficient Arithmetic on Genus 2 Hyperelliptic Curves over Finite Fields via Explicit Formulae", at <<http://mirror.cr.yp.to/eprint.iacr.org/2002/121,pdf>>, Dec. 15, 2003, pp. 13.

Lange, "Formulae for Arithmetic on Genus 2 Hyperelliptic Curves", available at least as early as Sep. 27, 2007, at <<http://www.hyperelliptic.org/tanja/preprints/expl.pdf>>, pp. 30.

Taylor, "The Point Counting Problem for Curves over Finite Fields", at <<http://www.maths.ed.ac.uk/~s0677951/y1report.pdf>>, University of Edinburgh, May 2007, pp. 19.

Weng, "Generating Parameters for Genus 2 Hyperelliptic Curve Cryptography", Mathematics of Computation vol. 72 (241) p. 435 (2002).

* cited by examiner

EXEMPLARY METHOD 200

FOR A DEFINED CM FIELD, PROVIDE:
(A) A PRIME NUMBER "P"; AND
(B) A NUMBER OF POINTS "N" ON A JACOBIAN OF A HEC OVER A PRIME FIELD OF "P" ELEMENTS;
WHERE "P" AND "N" ARE DETERMINED, AT LEAST IN PART, USING NON-LINEAR POLYNOMIALS OF AN INTEGER "X".
204

PUBLISHING A POINT ON THE JACOBIAN FOR USE IN A DIFFIE-HELLMAN PROTOCOL.
208

FIG. 2

ALGORITHMS FOR GENERATING PARAMETERS FOR GENUS 2 HYPERELLIPTIC CURVE CRYPTOGRAPHY

BACKGROUND

Public-key cryptographic techniques are one type of key-based cipher. In public-key cryptography, each communicating party has a public/private key pair. The public key of each pair is made publicly available (or at least available to others who are intended to send encrypted communications), but the private key is kept secret. In order to communicate a message using encryption to a receiving party, an originating party encrypts the message using the public key of the receiving party and communicates the encrypted message to the receiving party. Upon receipt of the encrypted message, the receiving party decrypts it using its secret private key, and thereby recovers the original message.

The Diffie-Hellman protocol is a well-known example of public/private key cryptography. The DH protocol assumes that it is infeasible to compute $g^{\alpha\beta}$ (the shared secret) knowing only $g^\alpha$ and $g^\beta$. For example, Alice and Bob agree to use a prime number p=23 and base g=5. Alice chooses a secret integer $\alpha$=6, then sends Bob ($g^\alpha$ mod p), which is $5^6$ mod 23=8. Bob chooses a secret integer $\beta$=15, then sends Alice ($g^\beta$ mod p), which is $5^{15}$ mod 23=19. Alice computes ($g^\beta$ mod p)$^\alpha$ mod p, which is $19^6$ mod 23=2. Bob computes ($g^\alpha$ mod p)$^\beta$ mod p, which is $8^{15}$ mod 23=2.

In recent years, the original DH protocol has been understood to be an example of a much more general cryptographic technique, the common element being the derivation of a shared secret value (i.e., a shared key) from one party's public key and another party's private key. The parties' key pairs may be generated anew at each run of the protocol.

New curve-based cryptography techniques have recently been employed for cryptography. Such techniques allow for more secure communications and for software manufacturers to appreciably reduce the incidence of unauthorized copying of software products. For example, product IDs have been generated using hyperelliptic curve cryptography techniques (HECC techniques). The resulting product IDs provide improved security. Moreover, such IDs can be configured such that the user is not required to input too many characters.

Jacobian groups of HECs are suitable for discrete logarithmic (DL) cryptosystems (e.g., ElGamal, DH and digital signature cryptosystems). In HECC, a Jacobian of a curve of genus g provides a number of points over a finite field F of q elements ($F_q$) where the number of points is approximately $q^g$. In order to use the Jacobian of a curve for cryptography, suitable parameters must be chosen. One such parameter pertains to the underlying finite field $F_q$ over which the curve is defined. Another important parameter is the cardinality N of the $F_q$-rational Jacobian of the curve. For many implementations of a discrete logarithm based cryptosystem, $F_q$ should be a prime field, i.e., q is a prime number p (i.e., $F_p$), and N, the cardinality (or group order) of the Jacobian is prime or "close to" a prime number. Some refer to this as the group order problem on HECs over finite fields. Generally, solutions proceed by fixing a particular type of number field called a Complex Multiplication (CM) field (i.e., a totally imaginary field quadratic extension of a totally real number field) and then finding a suitable prime p and a possible group order N or possible group orders (e.g., $N_1, N_2, \ldots, N_n$).

Generation of the parameter values for p and N can be time consuming for a genus 2 curve with a cryptographic size of 128 bits as it involves counting the number of points on the Jacobian of the curve over a prime field. As described herein, various exemplary algorithms are presented for generating cryptographically strong parameters (e.g., a "p" and one or more "N"s) for the CM construction of genus 2 curves.

SUMMARY

An exemplary method includes defining a CM field, representing coefficients of a Frobenius element of a hyperelliptic curve over a prime field as non-linear polynomials that are functions of an integer x and selecting a value for x whereby the product of the Frobenius element and its complex conjugate is a prime number. Such a method may further include determining the order of the Jacobian of the hyperelliptic curve, for example, where the order is an almost prime number. Various other methods, devices, systems, etc., are also disclosed, which may be optionally used for cryptography.

DESCRIPTION OF DRAWINGS

Non-limiting and non-exhaustive examples are described with reference to the following figures:

FIG. 2 is a diagram of an exemplary method for publishing a point on a Jacobian for use in a Diffie-Hellman protocol;

DETAILED DESCRIPTION

Figure 1:
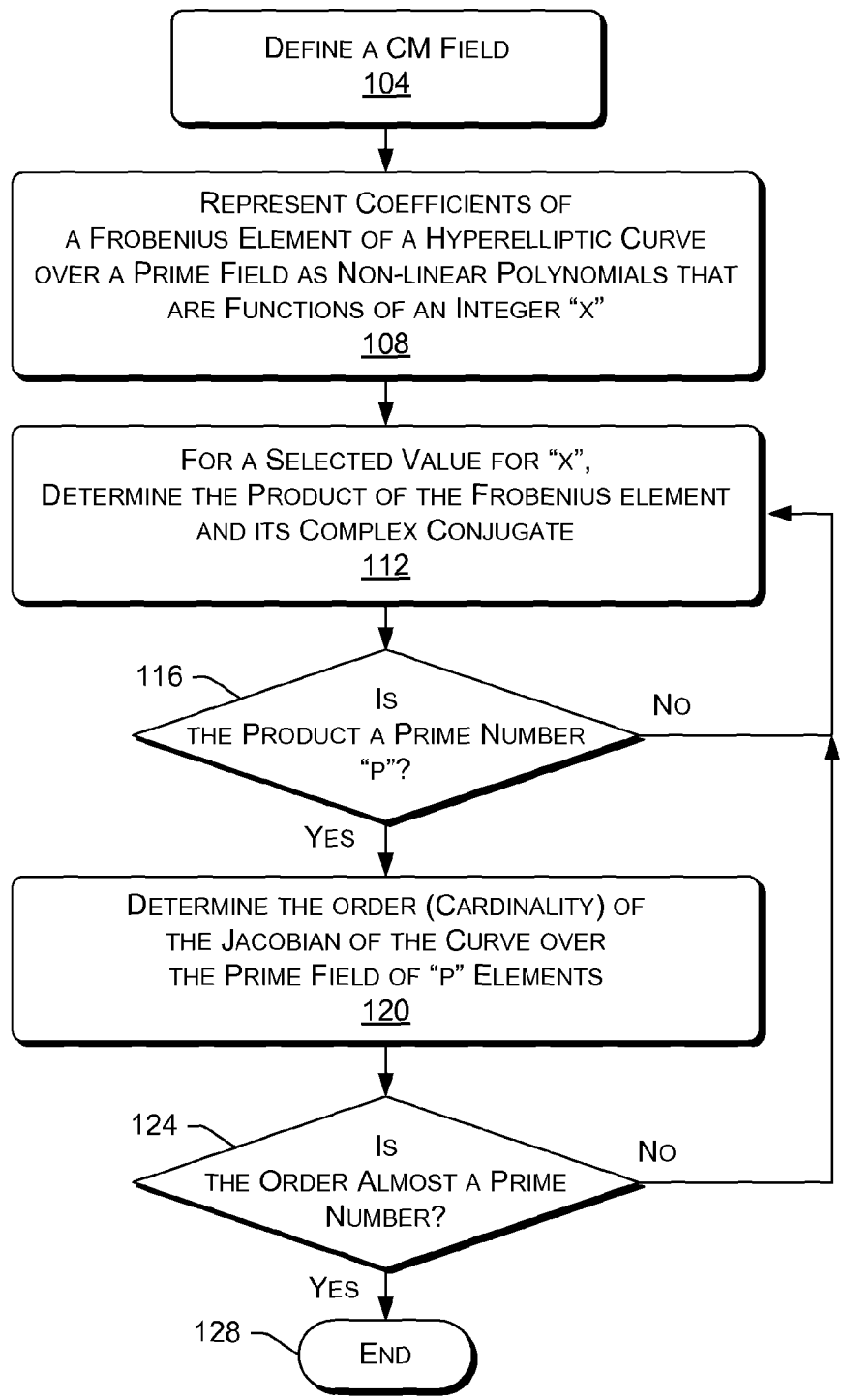
FIG. 1 is a diagram of an exemplary method that represents coefficients of a Frobenius element as non-linear polynomials.

Various exemplary methods, devices and system described herein pertain to hyperelliptic curve cryptosystems (HECCs). An exemplary algorithm can generate parameter values p and N for an underlying finite field $F_p$ for an HEC and the cardinality N of the $F_p$-rational Jacobian of the HEC, respectively. An exemplary algorithm represents the parameter p in terms of polynomials. Such an algorithm can reduce computation requirements (e.g., computation time, or resource requirements). Such an exemplary algorithm can start from a specific collection of invariants associated to a primitive quartic complex multiplication (CM) field, denoted K.

An exemplary method can start with a "Complex Multiplication" (CM) field, which is a number field, meaning that it is a finite extension of the field of the rational numbers. In such a method, a finite field is defined by the prime number p, which is one of the parameters of a cryptosystem (i.e., the number of elements of the finite field is a prime number p so it may be called a "prime field"). For a defined CM field, one wants to find a genus 2 curve (e.g., given by an appropriate equation) over a prime field such that the "endomorphism ring" of the Jacobian of the curve over the prime field is a subring of the ring of the algebraic integers of the CM field.

In the foregoing method, the various mathematical objects can be identified, such as, (i) a prime field; (ii) a genus 2 curve over a prime field'; (iii) a Jacobian of the curve (over a prime field); (iv) an endomorphism ring of the Jacobian (of the curve over a prime field); (v) a CM field; and (vi) algebraic integers of the CM field.

As described herein, (i) a "prime field" ($F_p$), is a field with p elements, where p is a prime number; (ii) a "genus 2 curve over a prime field" is given by an equation in two variables (e.g., x and y) with coefficients in the prime field $F_p$; (iii) the "($F_q$ rational points of the) Jacobian of the curve" is a mathematical object related to the curve, but not a subset of the curve and given a curve equation over a prime field Fp, its Jacobian is a finite set, whose order/cardinality is denoted by N; (iv) the "endomorphism ring/algebra of the Jacobian" is another mathematical object that is related to the Jacobian, but not a subset of the Jacobian; and (v-vi) the "algebraic integers of the CM field" is a subset of the "CM field".

Accordingly, an endomorphism ring/algebra of the Jacobian of a genus 2 curve is desired to be a subring of the ring of algebraic integers of a CM field. In other words, the ring of the "algebraic integers of a CM field" has the "endomorphism ring of the Jacobian" as a subset. This is an inclusion relation that involves "the endomorphism ring of the Jacobian" and the "algebraic integers of the CM field". Further, the Frobenius element is sought to be an element of the endomorphism ring and hence an element of the subring of the ring of algebraic integers of the CM field. Or more generally, the Frobenius element is sought to be an element of the ring of integers of the CM field.

Various exemplary algorithms can be combined to form an overall algorithm. Implementation of these algorithms is described further below with respect to some actual trial results.

Let $K:=Q(\eta)$, where $\eta=i(a+b(d^{0.5}))^{0.5}$ if $d\equiv 2, 3 \pmod 4$; and $\eta=i(a+0.5b(-1+d^{0.5}))^{0.5}$ if $d\equiv 1 \pmod 4$, be a fixed primitive quartic CM field, where $d>0$ is squarefree and $Q(d^{0.5})$ has class number 1. The condition that K is primitive is equivalent to $\Delta>0$ is not a square, where $\Delta=a^2-b^2d>0$, if $d\equiv 2, 3 \pmod 4$, and $\Delta=a^2-a\cdot b-0.25b^2(d-1)$, if $d\equiv 1 \pmod 4$.

As described herein, it is desirable to construct a genus 2 hyperelliptic curve C over a finite field $F_p$ of prime order such that $\text{End}(\text{Jac}F_q(C))\otimes Q=K$, and $N:=\#\text{Jac}F_q(C)$ is "almost prime", meaning that N is a product of a large prime number and a small cofactor. If such a curve C is found, then there exists an element, called the Frobenius element, $\pi\in\text{End}(\text{Jac}F_q(C))$ (i.e., $\pi$ is an endomorphism on the Jacobian of the curve C over the finite field $F_q$) that satisfies the condition that $\pi\bar{\pi}=q$, where $\bar{\pi}$ is the complex conjugate of $\pi$.

In the analysis described herein, the concept of Weil numbers may be used. For example, let p be a prime and $q=p^a$ a power of p. An algebraic integer $\pi$ is called a q-Weil number, if $\pi^\sigma\bar{\pi}^\sigma=q=p^a$ and $\pi^\sigma$ is any conjugate of $\pi$.

Assume that the Frobenius element $\pi$ is in an order as follows for two particular cases (first case and second case):

$$O:=Z+d^{0.5}Z+\eta Z+\eta d^{0.5}Z, \text{if } d\equiv 2,3 \pmod 4; \text{ and}$$

$$O:=Z+0.5(-1+d^{0.5})Z+\eta Z+0.5\eta(-1+d^{0.5})Z,$$
$$\text{if } d\equiv 1 \pmod 4.$$

The first case is described followed by the second case. In the first case $d\equiv 2, 3 \pmod 4$, the Frobenius element is written $\pi=c_1+c_2d^{0.5}+\eta(c_3+c_4d^{0.5})$, $c_i\in Z$.

For the first case, the relationship $\pi\bar{\pi}=p$ provides:

$$(c_1^2+c_2^2d+c_3^2a+c_4^2ad+2c_3c_4bd)+(2c_1c_2+2c_3c_4a+c_3^2b+c_4^2bd)d^{0.5}=p.$$

Since "1" and $d^{0.5}$ are linearly independent over Q, the following equations exist:

$$c_1^2+c_2^2d+c_3^2a+c_4^2ad+2c_3c_4bd=p \quad (1)$$

$$2c_1c_2+2c_3c_4a+c_3^2b+c_4^2bd=0 \quad (2)$$

Also, for the first case, let $\bar{\alpha}$ and $\alpha^\sigma$ denote the imaginary and real embeddings of K into $\bar{K}$.

For the first case, the characteristic polynomial of $\pi$ is $$h(x) = (x-\pi)(x-\bar{\pi})(x-\pi^\sigma)(x-\bar{\pi}^\sigma)$$
$$= x^4 - 4c_1x^3 + (2p+4(c_1^2-c_2^2d))x^2 - 4c_1px + p^2$$

The fact that $\#\text{Jac}F_q(C)=h(1)$ gives the condition for N:

$$N=(p+1)^2-4(p+1)c_1+4(c_1^2-c_2^2d) \quad (3)$$

As mentioned, it is desirable to have N be almost prime, i.e., $N=c\cdot r$ with r prime and c small (e.g., $c<2000$).

For the present analysis, a prime number p is roughly the size of $N^{0.5}$ (i.e., $p\sim N^{0.5}$). A technique described by Weng, "Constructing hyperelliptic curves of genus 2 suitable for cryptography", *Mathematics of Computation*, Vol. 72, No. 241, pp. 435-458 (2002), searches for parameters to provide prime p and almost prime N with a heuristic probability $\sim 1/(\log N)^2$. While this probability may be acceptable for some implementations, the technique of Weng relies on factorization of big integers, repeatedly in every step of the search, which makes the Weng technique computationally intensive (e.g., slow or unsuitable for devices with limited computing resources). The Weng article is incorporated herein by reference.

An exemplary algorithm described herein is more efficient than the technique of Weng for generating parameters for genus 2 cryptography. The exemplary algorithm includes parameterizing the coefficients $c_i$ (e.g., where i=1, 2, ... n) as polynomials $c_i(x)$ and then generating "families of parameters" by factorizing quartic polynomials with small integral coefficients. In this representation, x is an integer, which may be selected as described further below.

An exemplary algorithm finds polynomials $c_1(x)$, $c_2(x)$, $c_3(x)$, $c_4(x)\cup Q[x]$, for example, all of the same degree (to control the sizes of parameters), satisfying the equation:

$$-2c_1(x)c_2(x)=2c_3(x)c_4(x)a+c_3^2(x)b+c_4^2(x)bd.$$

Given a polynomial representation and the foregoing equation, p(x) can be written as:

$$p(x)=c_1^2(x)+c_2^2(x)d+c_3^2(x)a+c_4^2(x)ad+2c_3(x)c_4(x)bd,$$

Given this representation of p, an exemplary algorithm lets x range through integer values (e.g., of certain sizes) until the value p(x) is a prime number. Once the value of p(x) is a prime number, Equation (3) can be used to compute the cardinality of the Jacobian (N) and check if it is almost prime (i.e., is N almost prime?).

The following lemma (Lemma 1) can help to avoid some inappropriate or sub-optimal choices of $c_i(x)$.

Lemma 1:

Let $c_1(x)$, $c_2(x)$, $c_3(x)$, $c_4(x)$ be linear polynomials in Q[x] such that:

$$2c_1(x)c_2(x)+2c_3(x)c_4(x)a+c_3^2(x)b+c_4^2(x)bd=0.$$

Then $p(x)=c_1^2(x)+c_2^2(x)d+c_3^2(x)a+c_4^2(x)ad+2c_3(x)c_4(x)bd$ is reducible in Q[x].

Proof of Lemma 1.

Let $c_1(x)$, $c_2(x)$, $c_3(x)$, $c_4(x)$ be linear polynomials in Q[x] such that:

$$2c_1(x)c_2(x)+2c_3(x)c_4(x)a+c_3^2(x)b+c_4^2(x)bd=0.$$

Then we have:

$$-2c_1(x)c_2(x)=2c_3(x)c_4(x)a+c_3^2(x)b+c_4^2(x)bd \quad (4)$$

Let $\alpha\in Q$ be a root of $c_1(x)$. Clearly, $$0=-2c_1(\alpha)c_2(\alpha)=bc_3^2(\alpha)+2ac_3(\alpha)c_4(\alpha)+bdc_4^2(\alpha)=0 \quad (5)$$

Examine the quadratic equations:

$$bX^2+2aX+bd=0 \quad (6)$$

$$bdX^2+2aX+b=0 \quad (7)$$

Both Equations (6) and (7) have discriminant $\Delta=(2a)^2-4b(bd)=4(a^2-b^2d)>0$, which is not a square in Q by the assumption on a, b and d, namely, that K is primitive. Therefore, Equation (5) holds if and only if $c_3(\alpha)=c_4(\alpha)=0$. Hence, $c_3(\alpha)=c_4(\alpha)=0$. By Equation (5) one can conclude that $\alpha$ is a zero of $-2c_1(x)c_2(x)$ with multiplicity 2. Since $c_1(x)$ and $c_2(x)$ are linear, one must have $c_2(\alpha)=0$.
Therefore, the polynomial:

$$p(x)=c^2_1(x)+c^2_2(x)d+c^2_3(x)a+c^2_4(x)ad+2c_3(x)c_4(x)bd$$

has $\alpha$ as a zero of multiplicity 2. So $(x-\alpha)^2 | p(x)$ in $Q[x]$. Obviously, $p(x)$ is reducible.

Since it is desirable to want $p(x)$ to be prime for some values $x \in Z$, it is reasonable, given Lemma 1 and corresponding proof, to expect $p(x)$ to be irreducible. Therefore, an exemplary technique chooses $c_3(x)$ and $c_4(x)$ to be quadratic polynomials, as elaborated with respect to Algorithm 1 below.

Algorithm 1: Parameter generator polynomials for $K=Q(\eta)$, $d \equiv 2, 3 \pmod 4$.

Input: Integers a, b, d with $d>0$ squarefree, $d \equiv 2, 3 \pmod 4$, $a^2-b^2d>0$ not a square.

Output: Four quadratic polynomials $c_1(x)$, $c_2(x)$, $c_3(X)$, $c_4(x)$ and a quartic polynomial $p(x)$ are generated such that they satisfy Equations (1) and (2). Polynomials $N_1(x)$ and $N_2(x)$ of degree 8 are generated as possible group orders.

1: Repeat (e.g., "repeat" is an opening tag of a loop that corresponds to a closing tag "until" where intervening operations are performed until one or more conditions are satisfied).
2: Repeat.
3: Choose quadratic polynomials $c_3(x)$ and $c_4(X)$ in $Z[x]$ with small coefficients and $\gcd(c_3(x), c_4(x))=1$.
4: Set $n(x)=2c_3(x)c_4(x)a+c^2_3(x)b+c^2_4(x)bd$.
5: Until deg $n(x)=4$ and $n(x)=\tilde{c}_1(x) \cdot \tilde{c}_2(x)$, deg $\tilde{c}_1(x)=2=$deg $\tilde{c}_2(x)$, $\gcd(\tilde{c}_1(x), \tilde{c}_2(x))=1$, $n(x)$ and $\tilde{c}_1(x)$ have the same content.
6: Set $c_1(x)=-0.5 \tilde{c}_1(x)$, $c_2(x)=\tilde{c}_2(x)$.
7: Set $p(x)=c^2_1(x)+c^2_2(x)d+c^2_3(x)a+c^2_4(x)ad+2c_3(x)c_4(x)bd$.
8: Until $p(x)$ is irreducible and has no fixed prime divisor (a prime q is a fixed prime divisor of a polynomial $f(x)$ with rational coefficients if q divides every integer-valued $f(n)$ for integers n).
9: Set $N_1(x)=(p(x)+1)^2-4(p(x)+1)c_1(x)+4(c^2_1(x)-c^2_2(x)d)$, $N_2(x)=(p(x)+1)^2+4(p(x)+1)c_1(x)+4(c^2_1(x)-c^2_2(x)d)$.

Algorithm 1: Parameter generator polynomials for $K=Q(\eta)$, $d \equiv 1 \pmod 4$.
For the case $d \equiv 1 \pmod 4$, the Frobenius element can be written as:

$$\pi=c_1+0.5c_2(-1+d^{0.5})+\eta(c_3+0.5c_4(-1+d^{0.5})), c_i \in Z$$

Again, $\pi\bar{\pi}=p$ gives $$(c^2_1+0.25(d-1)c^2_2+ac^2_3+0.5b(d-1)c_3c_4+0.25(a-b)(d-1)c^2_4)+(2c_1c_2-c^2_2+bc^2_3+2(a-b)c_3c_4+(0.25b(d+3)-a)c^2_4)(0.5(-1+d^{0.5}))=p.$$

The linear independence of 1 and $0.5(-1+d^{0.5})$ over Q implies the following two equations:

$$c^2_1+0.25(d-1)c^2_2+ac^2_3+0.5b(d-1)c_3c_4+0.25(a-b)(d-1)c^2_4=p \quad (8)$$

$$2c_1c_2-c^2_2+bc^2_3+2(a-b)c^3c^4+(0.25(b(d+3)-a))c^2_4=0 \quad (9)$$

The corresponding cardinality (or order) of the Jacobian is as follows:

$$N=(p+1)^2-(4c_1-2c_2)(p+1)+4[c^2_1-c_1c_2-0.25(d-1)c^2_2] \quad (10)$$

Algorithm 2: Parameter generator polynomials for $K=Q(\eta)$, $d \equiv 1 \pmod 4$ Input: Integers a, b, d with $d>0$ squarefree, $d \equiv 1 \pmod 4$, $a^2-ab-0.25b^2(d-1)>0$ not a square.

Output: Four quadratic polynomials $c_1(x)$, $c_2(x)$, $c_3(x)$, $c_4(x)$ and a quartic polynomial $p(x)$ are generated such that they satisfy the equations (8) and (9). Polynomials $N_1(x)$ and $N_2(x)$ of degree 8 are generated as possible group orders.

1: Repeat (e.g., "repeat" is an opening tag of a loop that corresponds to a closing tag "until" where intervening operations are performed until one or more conditions are satisfied).
2: Repeat.
3: Choose quadratic polynomials $c_3(x)$ and $c_4(X)$ in $Z[x]$ with small coefficients and $\gcd(c_3(x), c_4(x))=1$.
4: Set $n(x)=2c_3(x)c_4(x)a-c^2_4(x)a+c^2_3(x)b-2c_3(x)c_4(x)b+0.25c^2_4(x)b(d+3)$.
5: Until deg $n(x)=4$ and $n(x)=\tilde{c}_1(x) \cdot \tilde{c}_2(x)$, deg $\tilde{c}_1(x)=2=$deg $\tilde{c}_2(x)$, $\gcd(\tilde{c}_1(x), \tilde{c}_2(x))=1$, $n(x)$ and $\tilde{c}_1(x)$ have the same content.
6: Set $c_1(x)=\tilde{c}_1(x)$, $c_2(x)=0.5(-\tilde{c}_2(x)+c_1(x))$.
7: Set $p(x)=c^2_1(x)+0.25c^2_2(x)(d-1)+c^2_3(x)a+0.25c^2_4(x)a(d-1)+0.5c_3(x)c_4(x)b(d-1)-0.25bc^2_4(x)(d-1)$.
8: Until $p(x)$ is irreducible and has no fixed prime divisor (a prime q is a fixed prime divisor of a polynomial $f(x)$ with rational coefficients if q divides every integer-valued $f(n)$ for integers n).
9: Set:
$N_1(x)=(p(x)+1)^2-(p(x)+1)(4c_1(x)-2c_2(x))+4(c^2_1(x)-c_1(x)c_2(x)-0.25c^2_2(x)(d-1)$,
$N_2(x)=(p(x)+1)^2+(p(x)+1)(4c_1(x)-2c_2(x))+4(c^2_1(x)-c_1(x)c_2(x)-0.25c^2_2(x)(d-1)$.

The polynomials returned from Algorithms 1 and Algorithm 2 are candidates of parameter generator polynomials. These polynomials can be inserted with various integer values for x, where the values are of a suitable size, until $p(x)$ is prime and $N_1(x)$ or $N_2(x)$ is almost prime. Hence, the Algorithms 1 and Algorithm 2 can provide for a parameter value for p (i.e., a large prime) and two cardinalities or orders $N_1$ and $N_2$, which also depend on the value of the integer x. This process is written formally as Algorithm 3, which follows.

Algorithm 3: Algorithm for generating parameters for HEC cryptography (HECC).

Input: Polynomials $c_1(x)$, $p(x)$, $N_1(x)$ and $N_2(x)$ generated by Algorithm 1 or Algorithm 2; bit size of the desired size of the prime field over which the curve is defined, $\mu$; and the maximum number of trials, M.

Output: Triples $(p, N_1, N_2)$ for constructing hyperelliptic curves over $F_p$ with CM by $K=Q(\eta)$ whose Jacobians have almost prime group orders $N_1$ or $N_2 \sim 2^{(2\mu)}$; or "Not found".

1: Set number of trial m=0 (i.e., m=0, 1, . . . , M).
2: Repeat. (e.g., "repeat" is an opening tag of a loop that corresponds to a closing tag "until" where intervening operations are performed until one or more conditions are satisfied).
3: Choose $x_0 \sim 2^{0.25\mu}$ (i.e., an initial value for integer x, of a suitable size that depends on the bit size $\mu$).
4: If $c_1(x_0)$ is an integer then
5: $p \leftarrow p(x_0)$.
6: If p is prime, $2^{\mu-1}<p<2^\mu$, and $N_1 \leftarrow N_1(x_0)$ or $N_2 \leftarrow N_2(x_0)$ is almost prime then
7: Return $(p, N_1, N_2)$.
8: End if.
9: End if.
10: $m \leftarrow m+1$.
11: Until m=M.
12: Return "Not Found".

FIG. 1 shows an exemplary method 100 for determining a prime field and an order for an HEC over this prime field. The method commences in a definition block 104 that defines a quartic CM field. A representation block 108 represents coefficients of a Frobenius element of a HEC, over the defined field, as non-linear polynomials. For example, consider, the non-linear polynomials for the coefficients $c_1$, $c_2$, $c_3$ and $c_4$, which are a function of an integer x. In a selection and determination block 112, a value for the integer is selected and the product of the Frobenius element and its complex conjugate is determined (e.g., $\pi\bar{\pi}=p$).

In the example of FIG. 1, a decision block 116 follows that decides if the product is a prime number "p". If the decision block 116 decides that the product is not a prime number, then the method 100 returns to the selection and determination block 112 to select a different value for the integer x. However, if the product is a prime number, then the method 100 continues at a determination block 120 that determines the order (cardinality) of the Jacobian of the HEC over the prime field defined by this prime number. Another decision block 124 decides if the order is almost a prime number. If the decision block 124 decides that the order is not almost a prime number, then the method 100 continues at the selection and determination block 112 to select a different value for the integer x. However, if the decision block 124 decides that the order is almost a prime number, then the method 100 terminates in a termination block 128, as a prime (i.e., the product) and an order (e.g., N) have been found that meet certain criteria.

While the method 100 shows only a single order being determined in the determination block 120, as explained above, more than one order may be determined. For example, the method 100 may determine a triple (p, $N_1$, $N_2$) where the decision block 124 decides if one of the orders is almost prime, which may be sufficient. The existence of multiple orders stems from the multiplicity of solutions, as described with respect to Algorithm 1 and Algorithm 2, above.

The method 100 searches for factorizations of polynomials as opposed to the technique of Weng, which searches for factorizations of integers. The method 100 essentially parameterizes the coefficients of the Frobenius element as non-linear polynomials (e.g., polynomials having a degree greater than 1). In various examples, polynomials having a degree of two were used to represent the coefficients of the Frobenius element. As described herein, polynomials of higher degree may be optionally used; noting that, for sake of simplicity, second order polynomials suffice.

In the method 100, the decision block 116 decides if the product, which may be represented by an equation p(x), is a prime number or, in other words, is irreducible. In the decision block 124, the decision is made based on deciding if the order is almost irreducible. A large integer is almost prime if it can be written as a product of a large prime number and a relatively small cofactor. For example, the following 256-bit number N can be regarded as almost prime:
N=58216888249078746955854475856559517495479835454491180632120016819914968258608 where
N=$2^4$*3638555515567421684740904741034969843467489715905698789507501051244685516163, which is a product of a small number $2^4$=16 and a large (252-bit) prime number. For purposes of the method 100, the standard for almost irreducible or almost prime can be determined by specifying one or more criteria (e.g., number of prime factors).

FIG. 2 shows an exemplary method 200 for a Diffie-Hellman protocol. A provision block 204, provides, for a defined CM field, a prime number "p" and a number of points "N" on a Jacobian of a HEC over the finite field with p elements wherein "p" and "N" are determined, at least in part, using non-linear polynomials of an integer "x". A publication block 208 publishes the point "p" on the Jacobian for use in a Diffie-Hellman protocol.

Once the publication occurs, the method 200 may be used in a two-party key exchange as follows. As explained in the Background section, the DH protocol assumes that it is infeasible to compute $g^{\alpha\beta}$ (the shared secret) knowing only $g^\alpha$ and $g^\beta$. According to the method 200, Alice and Bob agree to use a public point on the Jacobian as base g. Alice chooses a secret exponent $\alpha$ and then sends Bob $g^\alpha$. Bob chooses a secret exponent $\beta$ and then sends Alice $g^\beta$. To derive the shared secret, Alice computes $g^{\beta\alpha}$ and Bob computes $g^{\alpha\beta}$.

Figure 3:
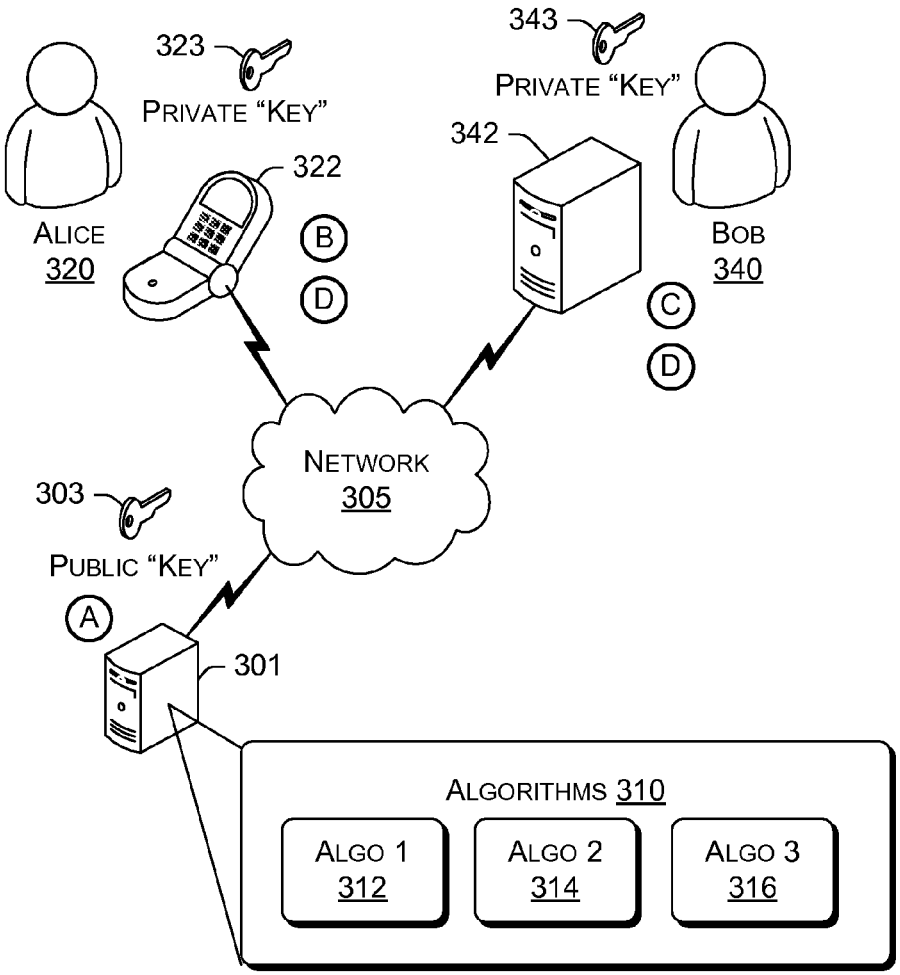
FIG. 3 is a diagram of an exemplary system for generating and publishing information for use in a protocol to secure communication.
Figure 3:
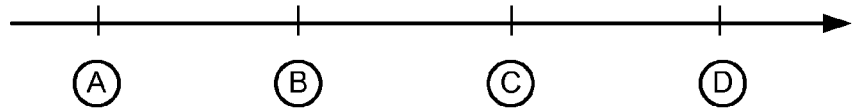

FIG. 3 shows an exemplary system 300 that includes a computing device 301 for generating a public key 303 according to an exemplary method that relies on one or more algorithms 310. For example, the algorithms 310 can include Algorithm 1 312, Algorithm 2 314 and Algorithm 3 316, as described herein. In general, the algorithms rely on representing coefficients as non-linear polynomials, which can make generation of information for use in cryptography more efficient (e.g., generation of the public key 303).

The system 300 further includes a network 305 that allows for communication between parties and acquisition and sharing of cryptographic information. For example, parties Alice 320 and Bob 340 desire to communicate in a secure manner over the network 305. Alice 320 relies on a computing device 322 to generate a private key 323 while Bob 340 relies on a computing device 342 to generate a private key 343. According to the timeline 307, the computing device 301 generates and publishes the public key 303, which is acquired by the devices 322 and 342. The device 322 raises the public key 303 to a power determined by the private key 323 (i.e., the private key may simply be a scaler) and the device 342 raises the public key 303 to a power determined by the private key 343. The values determined by the device 322 and the device 342 are then transmitted to each other. Once received, the device 322 and the device 342 can determine a shared key by, for example, raising the public key to the power determined by a respective private key (i.e., the private key 323 for the device 322 and the private key 343 by the device 342).

While several possible schemes have been described, the information generated by the algorithms 310 may be used in any of a variety of secure transactions. For example, information may be used to secure products such as software products.

An exemplary computing device (e.g., the device 301 of FIG. 3) includes a processor; and processor executable instructions to define a CM field, to represent coefficients of a Frobenius element of a hyperelliptic curve over a prime field as non-linear polynomials that are functions of an integer x and to select a value for x whereby the product of the Frobenius element and its complex conjugate is a prime number. Such a device may further include instructions to determine the order of the Jacobian of the hyperelliptic curve where the order comprises an almost prime number. Such a device may further include a network interface configured to communicate the prime number, the almost prime number or the prime number and the almost prime number for use in a cryptographic protocol.

In various examples, a cryptographic protocol may be a discrete logarithm-based protocol (e.g., a protocol selected from a group consisting of an ElGammal protocol, a Diffie-Hellman protocol and a digital signature protocol).

An exemplary computing device optionally includes instructions to protect a software product using, directly or indirectly, a selected integer x that generates the prime number. For example, using the Jacobian of a hyperelliptic curve determined by a selected value for the integer x.

Trial Results: Implementation of the foregoing algorithms produced trial results that were compared to the results achieved using the technique described in the article by Weng. The exemplary algorithms generated (prime, group order) pairs (p, N) with respect to randomly chosen quartic CM fields, specified by parameters a, b, d of small sizes, with class number 1. Trial factorization of integers up to a fixed bound (10,000) was used for the technique of Weng.

Trials for p of size 128-bit (μ):

(A) In the case d≡2, 3 (mod 4), the exemplary Algorithm 3 generated parameter pairs (p, N) at an average rate of 2.1402 seconds per pair, while the technique of Weng generated pairs at 7.7538 seconds per pair.

(B) In the case d≡1 (mod 4), our method generates parameter pairs at an average rate of 3.6423 seconds per pair while the technique of Weng generated pairs at 11.4407 seconds per pair.

Trials for p of size 256-bit (μ):

(A) In the case d≡2, 3 (mod 4), the exemplary Algorithm 3 generated parameter pairs at an average rate of 21.7344 seconds per pair, while the technique of Weng generated pairs at 97.9592 seconds per pair.

(B) In the case d≡1 (mod 4), the exemplary Algorithm 3 generated parameter pairs at an average rate of 41.0917 seconds per pair, while the technique of Weng generated pairs at 108.5106 seconds per pair.

Trials demonstrated robust operation, noting that in rare instances the exemplary Algorithm 3 failed to find suitable parameters. Given the robust operation of Algorithm 3, on average, as the size of the prime p increases, Algorithm 3 performs better than the technique of Weng, if complete factorization of integers is used for the technique of Weng.

Trials were performed using PARI/GP, which is a widely used computer algebra system designed for fast computations in number theory (factorizations, algebraic number theory, elliptic curves, etc.) that also contains a large number of other useful functions to compute with mathematical entities such as matrices, polynomials, power series, algebraic numbers etc., and transcendental functions.

In the trial results that follow, the primes $p(x_0)$, corresponding to value $x_0$, are of 128 bits and the group orders $N(x_0)$ are almost prime (in this case, a product of a positive integer<2000 and a prime number).

Example 1

Field Parameter Values a=20, b=1, d=19

Polynomials and p(x)
$c_1(x)=-(5/2)x^2-24x-39/2$,
$c_2(x)=12x^2+42x+5$,
$c_3(x)=x^2+2x+4$,
$c_4(x)=x^2+9x+1$.
$p(x)=(12721/4)x^4+26610x^3+(138247/2)x^2+17520x+6829/4$.
Orders $N_1(x)$ and $N_2(x)$
$N_1(x)=(161823841/16)x^8+169252905x^7+(4591135697/4)x^6+3790760034x^5+(45798567295/8)x^4+2521811013x^3+(2200243933/4)x^2+61359456x+48815721/16$,
$N_2(x)=(161823841/16)x^8+169252905x^7+(4590881277/4)x^6+3789617226x^5+(45742665623/8)x^4+2504037741x^3+(2143518849/4)x^2+58298352x+44551929/16$.
Integers, Primes and Orders
$x_0=548050991$,
$p(x_0)=286909637977764067855221276777587727961$,
$N_2(x_0)=823171403645316375151306210541599520231151108609903521409589466029688896856 24=$
$2^3 \cdot 103 \cdot 99899442189965579508653666327864019445528047161396058423493867236612730201$.
$x_0=507822535$,
$p(x_0)=211499402528761325611378043169347082601$,
$N_1(x0)=44731997270023012615201443067044482876392989995456465952479290805233356211416=$
$2^3 \cdot 32 \cdot 621277739861430730766686709264506706616569305492450916006656816739352169603$.

Example 2

Field Parameter Values a=49, b=2, d=43

Polynomials and p(x)
$c_1(x)=-19x^2-81x-57$,
$c_2(x)=25x^2+77x+37$,
$c_3(x)=3x^2+9x+7$,
$c_4(x)=2x^2+8x+4$.
$p(x)=37137x^4+245922x^3+534667x^2+411094x+103045$.
Orders $N_1(x)$ and $N_2(x)$
$N_1(x)=1379156769x^8+18265610628x^7+100192309254x^6+293537074164x^5+495845231429x^4+490539243800x^3+279450495148x^2+84849357864x+10641750132$.
$N_2(x)=1379156769x^8+18265610628x^7+100186664430x^6+293475629244x^5+495587670117x^4+490018152864x^3+278924635092x^2+84595125192x+10594761156$.
Integers, Primes and Orders
$x_0=269037344$,
$p(x_0)=194561585104011195498898535676821242693$,
$N_1(x_0)=378542103981853911199097346032135418109388519198214748958636145964694844460916=$
$2^2 \cdot 7 \cdot 17 \cdot 79525652097028132604852383620196516409535403192902258184587425622835807691$
$x_0=272775528$,
$p(x_0)=205602527203239038572121987052863495221$,
$N_1(x_0)=422723991923586488734262717190664693939353466298415798462079437671251902268 68=$
$2^2 \cdot 3 \cdot 101 \cdot 3487821715541142646322299646787662491248790976059536290941249485736401833 9$.

Example 3

Field Parameter Values a=24, b=7, d=21

Polynomials and p(x)
$c_1(x)=-7x^2-43x-15$,
$c_2(x)=7x^2+36x+23$,
$c_3(x)=x^2+8x+7$,
$c_4(x)=2x^2+9x+3$.
$p(x)=798x^4+8316x^3+26156x^2+22938x+6281$.
Orders $N_1(x)$ and $N_2(x)$
$N_1(x)=636804x^8+13272336x^7+110934348x^6+472179624x^5+1078878880x^4+1312636376x^3+863392212x^2+292135424x+40121116$.
$N_2(x)=636804x^8+13272336x^7+110867316x^6+471091656x^5+1072454392x^4+1296182464x^3+846125708x^2+284206952x+38789332$
Integers, Primes and Orders
$x_0=690918783$,
$p(x_0)=181848990878426194442759846747024276669$, $N_1(x_0)$=33069055483501933273197540182643492422771446574415202943269985210245986359248=
$2^4 \cdot$ 206681596771887082957484626141521827642321541090095018395437407564037414 7453.

$x_0$=788336903,
$p(x_0)$=30821255426446056168210701558661649 0669,
$N_2(x_0)$=94994978606223046358527917755472879305246966478154462196668039263663901 851088=
$2^4 \cdot$ 59371861628889403974079948597170549565 7793540488465388729175245397899386 5693.

Example 4

Field Parameter Values a=29, b=5, d=37

Polynomials and p(x)
$c_1(x) = -(1/2)x^2 + 24x + 23/2$,
$c_2(x) = 14x^2 + 96x + 30$,
$c_3(x) = 3x^2 + 8x + 3$,
$c_4(x) = x^2 + 8x + 1$.
$p(x) = (10045/4)x^4 + 31896x^3 + (228005/2)x^2 + 60120x + 35917/4$.
Orders $N_1(x)$ and $N_2(x)$
$N_1(x) = (100902025/16)x^8 + 160197660x^7 + (6360030839/4)x^6 + 7575598140x^5 + (135066868587/8)x^4 + 14293625076x^3 + (22676894823/4)x^2 + 1081276596x + 1291797801/16$.
$N_2(x) = (100902025/16)x^8 + 160197660x^7 + (6359428139/4)x^6 + 7573202220x^5 + (134962592611/8)x^4 + 14267236308x^3 + (22615799123/4)x^2 + 1077869028x + 1287774649/16$.
Integers, Primes and Orders
$x_0$=558110127,
$p(x_0)$=24365177040687011409891064310643746442 1,
$N_1(x_0)$=593661852224021470884231864299751692315609427590376956926324924374427918465 92=
$2^6 \cdot 3^3 \cdot$ 343554312629642054909856402951245192312273974299986664887919516420386526 89.

$x_0$=556747959,
$p(x_0)$=24128176111981350290240730470651757435 7,
$N_2(x_0)$=582168882490787469558544785565595174954798354544911806321200168199149682586 08=
$2^4 \cdot$ 363855551556742168474090474103496984346748971590569878950750105124468551 6163.

Exemplary Computing Device

Figure 4:
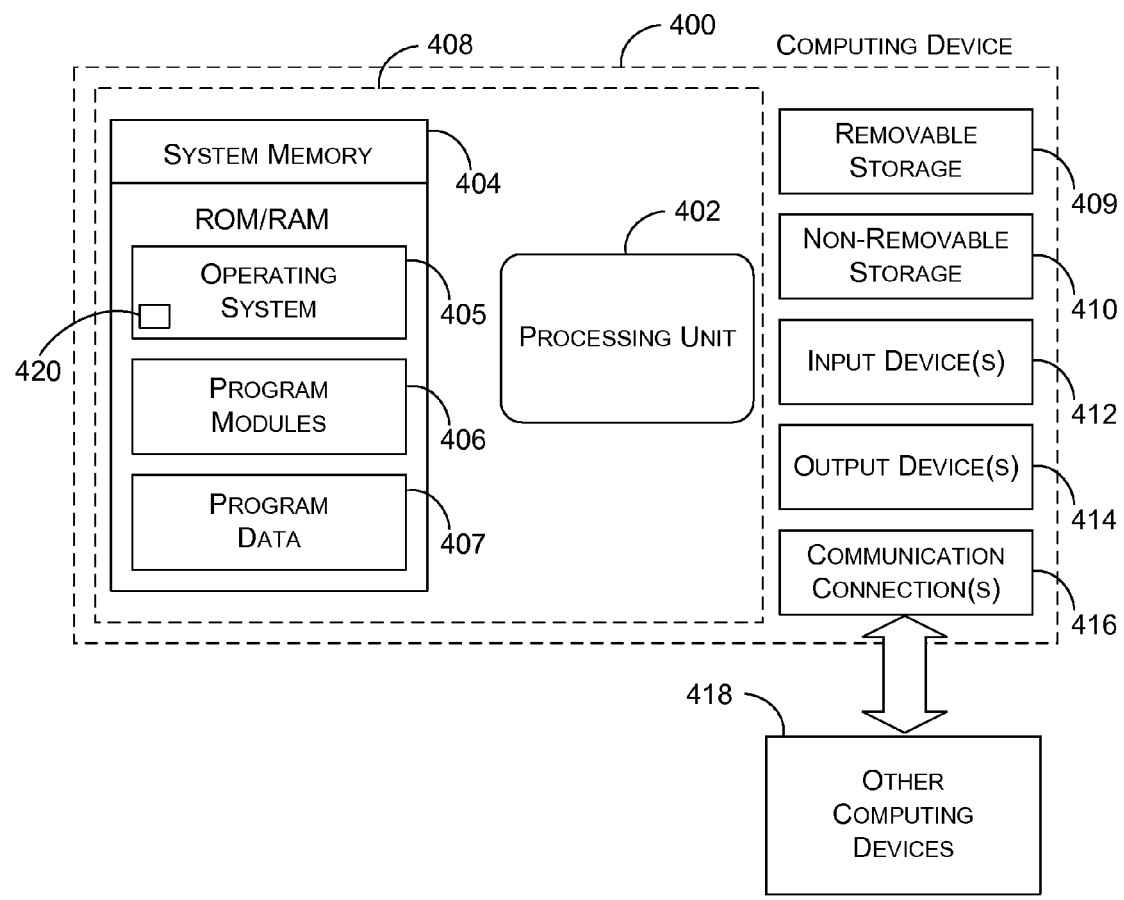
FIG. 4 is a block diagram of an exemplary computing device.

FIG. 4 illustrates an exemplary computing device 400 that may be used to implement various exemplary components and in forming an exemplary system. For example, the computing devices 301, 322 and 342 of the system of FIG. 3 may include various features of the device 400.

In a very basic configuration, computing device 400 typically includes at least one processing unit 402 and system memory 404. Depending on the exact configuration and type of computing device, system memory 404 may be volatile (such as RAM), non-volatile (such as ROM, flash memory, etc.) or some combination of the two. System memory 404 typically includes an operating system 405, one or more program modules 406, and may include program data 407. The operating system 405 include a component-based framework 420 that supports components (including properties and events), objects, inheritance, polymorphism, reflection, and provides an object-oriented component-based application programming interface (API), such as that of the .NET™ Framework marketed by Microsoft Corporation, Redmond, Wash. The device 400 is of a very basic configuration demarcated by a dashed line 408. Again, a terminal may have fewer components but will interact with a computing device that may have such a basic configuration.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and nonvolatile, removable and non-removable media implemented in any method or technology for storage of information, such as computer readable instructions, data structures, program modules, or other data. System memory 404, removable storage 409 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 400. Computing device 900 may also have input device(s) 412 such as keyboard, mouse, pen, voice input device, touch input device, etc. Output device(s) 414 such as a display, speakers, printer, etc. may also be included. These devices are well know in the art and need not be discussed at length here.

Computing device 400 may also contain communication connections 416 that allow the device to communicate with other computing devices 418, such as over a network. Communication connections 416 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented at least in part by a computing device, comprising:
    defining, by the computing device, a Complex Multiplication (CM) field;
    representing coefficients of a Frobenius element of a hyperelliptic curve over a prime field as non-linear polynomials that are functions of an integer x wherein the Frobenius element comprises an element of a ring of integers of the CM field; and
    iteratively selecting, by the computing device, a value for x until a product of the Frobenius element and a complex conjugate of the Frobenius element is a prime number.

2. The method of claim 1 further comprising determining an order of a Jacobian of the hyperelliptic curve.

3. The method of claim 2 further comprising determining if the order comprises an almost prime number, the almost prime number being represented as a product of a large prime number and a small cofactor.

4. The method of claim 3 further comprising implementing a discrete logarithm-based cryptography protocol using at least the prime number or the almost prime number.

5. The method of claim 4 wherein the protocol comprises a Diffie-Hellman protocol.

6. The method of claim 2 wherein the selected value for x generates an almost prime number for the order as a value of the non-linear polynomials.

7. The method of claim 1 wherein the non-linear polynomials comprise at least one second order polynomial.

8. The method of claim 1 comprising searching for factorizations of polynomials.

9. The method of claim 1 wherein the selected value for x generates a prime number as a value of the non-linear polynomials.

10. A method, implemented at least in part by a computing device, comprising:
parameterizing coefficients of the Frobenius element of a hyperelliptic curve as non-linear polynomials that include polynomials that depend on a common variable; and
based at least in part on the parameterizing, determining, by the computing device, the common variable that yields a prime number as a product of the Frobenius element and a complex conjugate of the Frobenius element and determining, by the computing device, one or more orders for a Jacobian of the hyperelliptic curve wherein at least one of the orders comprises an almost prime number.

11. The method of claim 10 wherein the common variable comprises integer values.

12. The method of claim 10 wherein the determining one or more orders comprises determining two orders.

13. The method of claim 10 wherein the non-linear polynomials comprise a second order polynomial.

14. A computing device comprising:
one or more processors; and
processor executable instructions to define a Complex Multiplication (CM) field, to represent coefficients of a Frobenius element of a hyperelliptic curve over a prime field as non-linear polynomials that are functions of an integer x wherein the Frobenius element comprises an element of a ring of integers of the CM field and to select a value for x that yields a prime number as a solution for a closed form equation that includes the non-linear polynomials, wherein the closed form equation represents a product of the Frobenius element and a complex conjugate of the Frobenius element as the prime number.

15. The computing device of claim 14 further comprising instructions to determine an order of a Jacobian of the hyperelliptic curve wherein the order comprises an almost prime number.

16. The computing device of claim 15 further comprising a network interface configured to communicate the prime number, the almost prime number or the prime number and the almost prime number for use in a cryptographic protocol.

17. The computing device of claim 16 wherein the cryptographic protocol comprises a discrete logarithm-based protocol.

18. The computing device of claim 16 wherein the cryptographic protocol comprises a protocol selected from a group consisting of an ElGammal protocol, a Diffie-Hellman protocol and a digital signature protocol.

19. The computing device of claim 14 further comprising instructions to protect a software product using, directly or indirectly, the Jacobian of a hyperelliptic curve determined by the selected value of the integer x.

\* \* \* \* \*